United States Patent
Kubota et al.

(10) Patent No.: US 11,718,347 B2
(45) Date of Patent: Aug. 8, 2023

(54) FRAME MEMBER

(71) Applicant: NIPPON STEEL CORPORATION, Tokyo (JP)

(72) Inventors: Hiroaki Kubota, Tokyo (JP); Yuri Toda, Tokyo (JP); Hiroyuki Kawata, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 248 days.

(21) Appl. No.: 17/292,945

(22) PCT Filed: Nov. 12, 2019

(86) PCT No.: PCT/JP2019/044309
§ 371 (c)(1),
(2) Date: May 11, 2021

(87) PCT Pub. No.: WO2020/100886
PCT Pub. Date: May 22, 2020

(65) Prior Publication Data
US 2022/0001929 A1 Jan. 6, 2022

(30) Foreign Application Priority Data
Nov. 14, 2018 (JP) ................................. 2018-213991

(51) Int. Cl.
*B62D 21/15* (2006.01)
*B62D 25/02* (2006.01)
(Continued)

(52) U.S. Cl.
CPC ......... *B62D 21/152* (2013.01); *B62D 25/025* (2013.01); *B62D 25/04* (2013.01);
(Continued)

(58) Field of Classification Search
CPC .... B62D 21/152; B62D 25/025; B62D 25/04; B62D 25/20; B62D 25/08; B62D 25/00;
(Continued)

(56) References Cited

U.S. PATENT DOCUMENTS 9,902,429 B2 * 2/2018 Okada ..................... B62D 21/15
10,464,511 B2 * 11/2019 Koga ....................... B60R 19/04
(Continued)

FOREIGN PATENT DOCUMENTS

JP 2007-246021 A 9/2007
KR 10-1509966 B1 4/2015
(Continued)

OTHER PUBLICATIONS

"Vickers hardness test—Test method", JIS Z 2244, 2009, total 52 pages.

*Primary Examiner* — Joseph D. Pape
*Assistant Examiner* — Dana D Ivey
(74) *Attorney, Agent, or Firm* — Birch, Stewart, Kolasch & Birch, LLP

(57) ABSTRACT

The frame member has a flat sheet portion with a recessed portion having a pair of wall portions and a bottom portion extending between tip portions in an extending direction of the pair of wall portions, in which a Vickers hardness of a region of the flat sheet portion excluding the recessed portion is 330 Hv or more, a depth of the recessed portion is 5 mm or more, when a width of the recessed portion is $L_0$ and a cross-sectional length of an inner peripheral wall of the recessed portion consisting of the pair of wall portions and the bottom portion is $L_1$, a value of $(L_1-L_0)/L_0$ is 0.18 or more and 2.8 or less, and a Vickers hardness of a ridgeline portion extending between the flat sheet portion and the recessed portion is 1.06 times or more and 1.20 times or less (Continued)

the Vickers hardness of the region of the flat sheet portion excluding the recessed portion.

6 Claims, 7 Drawing Sheets

(51) Int. Cl.
    *B62D 25/04*     (2006.01)
    *B62D 25/20*     (2006.01)
    *B62D 29/00*     (2006.01)
    *B62D 25/00*     (2006.01)
    *B21D 47/01*     (2006.01)
    *B62D 25/06*     (2006.01)
    *B62D 25/08*     (2006.01)
    *B21D 53/88*     (2006.01)

(52) U.S. Cl.
    CPC .............. *B62D 25/20* (2013.01); *B21D 47/01* (2013.01); *B21D 53/88* (2013.01); *B60Y 2306/01* (2013.01); *B62D 25/00* (2013.01); *B62D 25/06* (2013.01); *B62D 25/08* (2013.01); *B62D 29/007* (2013.01)

(58) Field of Classification Search
    CPC ...... B62D 29/007; B62D 25/06; B21D 47/01; B21D 53/88; B60Y 2306/01
    USPC .................................................... 296/187.08
    See application file for complete search history.

(56) References Cited

U.S. PATENT DOCUMENTS

2016/0280282 A1     9/2016   Nishimura et al.
2020/0376534 A1   12/2020   Otsuka

FOREIGN PATENT DOCUMENTS

WO     WO 2015/053125 A1     4/2015
WO     WO 2018/012588 A1     1/2018

\* cited by examiner

HARDNESS OF RIDGELINE PORTION / HARDNESS OF FLAT SHEET PORTION

FRAME MEMBER

TECHNICAL FIELD

The present invention relates to a frame member.

The present application claims priority based on Japanese Patent Application No. 2018-213991 filed in Japan on Nov. 14, 2018, the contents of which are incorporated herein.

RELATED ART

In the related art, a sheet-shaped member made of metal is processed into a member having a predetermined cross-sectional shape, and the processed member is used as a frame member of an automobile. Such a frame member needs to achieve weight reduction and have sufficient load resistance. A material having high strength, such as a high-tensile steel sheet, has therefore been used in some cases in recent years. On the other hand, when an impact resulting from collision acts on a product including the frame member, the frame member needs to behave in a desired deformation mode to efficiently absorb the impact.

Patent Document 1 below describes a technique for controlling a cross-sectional shape of a shock absorption member of an automobile in order to change a shock absorption property. That is, in the shock absorption member, a groove is provided in a web of a hat member, and the depth of the groove and the width of the groove are changed so as to have a predetermined ratio.

PRIOR ART DOCUMENT

Patent Document

[Patent Document 1] Japanese Unexamined Patent application, First Publication No. 2007-246021

DISCLOSURE OF THE INVENTION

Problems to be Solved by the Invention

However, with the technique described in Patent Document 1, it has been difficult to further improve shock absorption energy and further improve cross-sectional yield strength to exhibit a higher level of a shock absorption property in the frame member.

The present invention has been made in view of the problems described above. An object of the present invention is to provide a novel and improved frame member that allows further improvement of the shock absorption property.

Means for Solving the Problem

A summary of the present invention is as follows.
(1) A first aspect of the present invention is a frame member having a flat sheet portion with a recessed portion having a pair of wall portions and a bottom portion extending between tip portions in an extending direction of the pair of wall portions, in which a Vickers hardness of a region of the flat sheet portion excluding the recessed portion is 330 Hv or more, a depth of the recessed portion is 5 mm or more, when a width of the recessed portion is $L_0$ and a cross-sectional length of an inner peripheral wall of the recessed portion consisting of the pair of wall portions and the bottom portion is $L_1$, a value of $(L_1-L_0)/L_0$ is 0.18 or more and 2.8 or less, and a Vickers hardness of a ridgeline portion extending between the flat sheet portion and the recessed portion is 1.06 times or more and 1.20 times or less the Vickers hardness of the region of the flat sheet portion excluding the recessed portion.
(2) In the frame member according to (1) above, the width of the recessed portion may be 80 mm or less.
(3) In the frame member according to (1) or (2) above, the depth of the recessed portion may be 20 mm or less.
(4) In the frame member according to any one of (1) to (3) above, the value of $(L_1-L_0)/L_0$ may be 0.18 or more and 1.8 or less.
(5) In the frame member according to any one of (1) to (4) above, a ratio of the width of the recessed portion to a width along a surface position of the bottom portion may be 0.70 or more and 1.20 or less.

Effects of the Invention

The present invention provides a frame member that allows further improvement of a shock absorption property.

EMBODIMENT OF THE INVENTION

Figure 1:
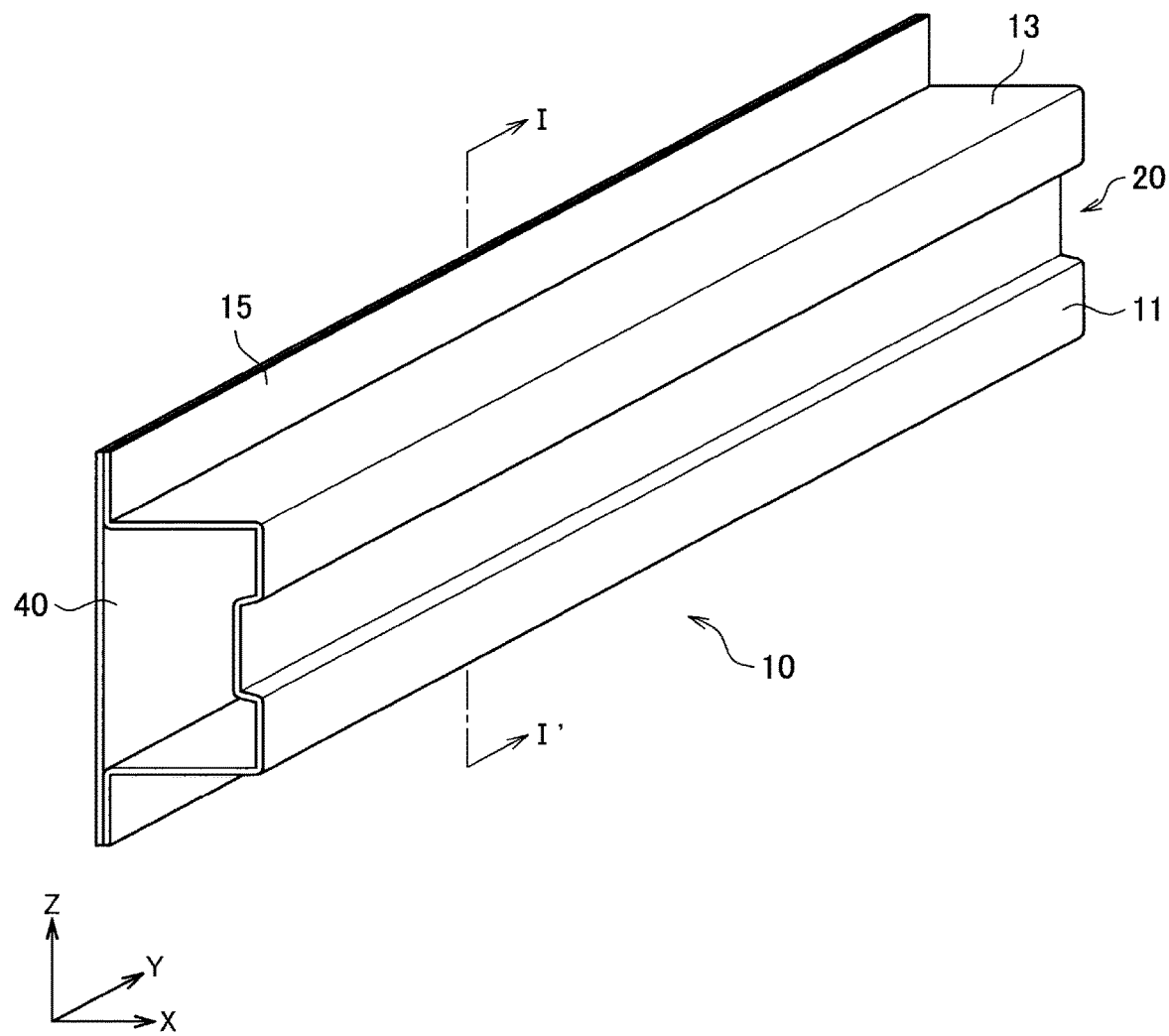
FIG. 1 is a partial perspective view showing an example of a frame member according to a first embodiment of the present invention.

The present inventors have diligently studied to further improve a shock absorption property. The present inventors have found the following and arrived at the present invention.
(1) A shock absorption property can be enhanced by providing a recessed portion having an appropriate shape in a flat sheet portion of a frame member, which is a high-strength material having a Vickers hardness of 330 Hv or more.
(2) In a frame member provided with a recessed portion, since stress is concentrated on a ridgeline portion of the recessed portion when deformed by receiving an impact, by increasing a Vickers hardness of the ridgeline portion with respect to the flat sheet portion, further excellent shock absorption property can be obtained.
(3) In addition, if the Vickers hardness of the ridgeline portion is too high compared to a Vickers hardness of the flat sheet portion, due to a hardness difference at a boundary between the ridgeline portion and the flat sheet portion, impact absorption energy cannot be increased by breaking from the boundary portion.

Preferred embodiments of the present invention will be described in detail below with reference to the accompanying drawings. In the present specification and the drawings, components having substantially the same functional configuration are designated by the same reference numerals to omit duplicate description.

1. First Embodiment

[Overall Structure of Frame Member]

First, with reference to FIG. 1, a partial structure of an example of a frame member according to the first embodiment of the present invention will be described. FIG. 1 is a partial perspective view showing an example of a frame member according to the present embodiment.

As an example, a frame member 10 extends in the Y direction shown in FIG. 1 as a longitudinal direction, and a cross section (a X-Z plane) orthogonal to the longitudinal direction has a substantially hat shape opened in the X direction. As an example, the frame member 10 has a flat sheet portion 11, a side wall portion 13 as a wall portion extending from the flat sheet portion 11 via a bent portion, and a flange section 15 which is bent outward from an end portion of a side opposite to the flat sheet portion 11 side of the side wall portion 13. Further, the flange portion 15 is welded to a sheet member 40 so that the frame member 10 can form a closed cross section. A recessed portion 20 protruding from the flat sheet portion 11 toward an inside of the closed cross section of the frame member 10 is formed in the flat sheet portion 11. The recessed portion 20 is formed in a groove shape along the longitudinal direction (the Y direction shown in FIG. 1) of the frame member 10.

The frame member 10 may be composed of various metal sheet members. In particular, the frame member 10 may be made of a steel sheet. As an example, steel materials having a tensile strength of 1.2 GPa class, 1.5 GPa class, 1.8 GPa class, and 2.5 GPa class can be mentioned. A Vickers hardness of a central portion of the thickness of the steel sheet having these tensile strengths is 330 Hv or more when the test load is 1 kgf (9.8 N) in a hardness test carried out by the method described in JIS Z 2244: 2009. The frame member 10 can be formed by applying various known processing techniques to a metal sheet member (blank material). As an example, the frame member 10 may be formed by forming a sheet member into a predetermined shape by cold drawing press working. The sheet thickness of the frame member 10 is preferably 0.4 mm or more and 2.5 mm or less in view of required shock absorption property and weight reduction.

[Structure of Recessed Portion]

Figure 2:
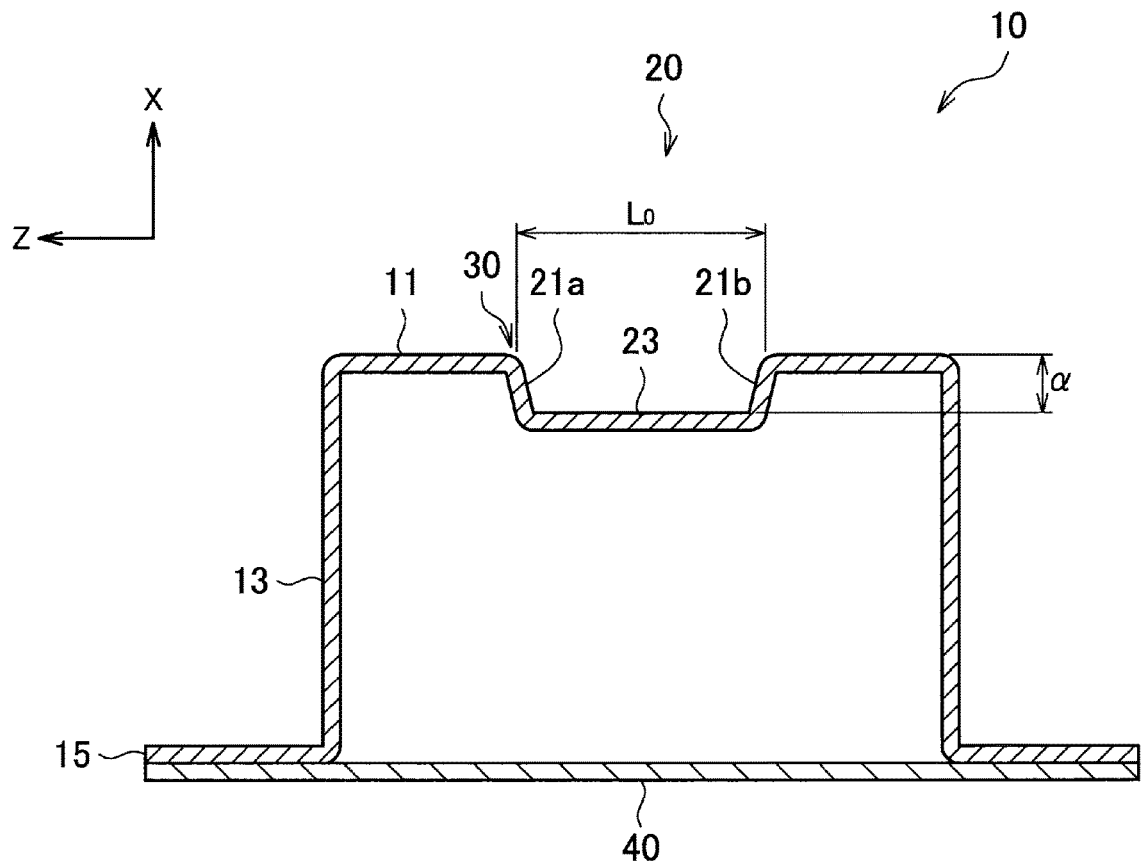
FIG. 2 is a cross-sectional view showing an example of the frame member according to the first embodiment along an X-Z plane.
Figure 3:
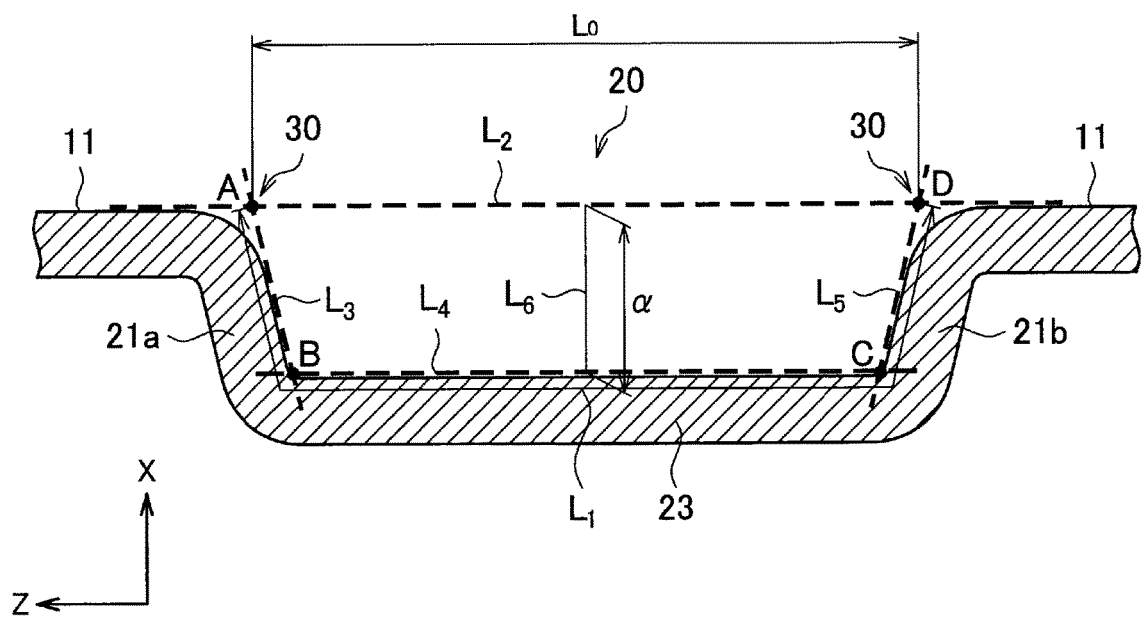
FIG. 3 is an enlarged view of a recessed portion showing an example of the frame member according to the first embodiment in the X-Z plane cross section.

Next, the configuration of the recessed portion 20 of the example of the frame member 10 according to the present embodiment will be described with reference to FIGS. 2 and 3. FIG. 2 is a cross-sectional view showing an example of the frame member according to the present embodiment along the X-Z plane, and is a cross-sectional view along 1-1' in FIG. 1. FIG. 3 is an enlarged view of the recessed portion 20 in the X-Z plane cross section showing an example of the frame member according to the present embodiment.

As shown in FIG. 2, the recessed portion 20 is a substantially rectangular (groove-shaped) portion which is formed in the flat sheet portion 11 and opened toward the X direction in FIG. 2. Since a maximum bending moment of the frame member 10 in the X-Z plane cross section is increased by having the recessed portion 20, a proof stress of the frame member 10 is improved, and the shock absorption property of the frame member 10 is also improved.

As shown in FIG. 3, the recessed portion 20 has a pair of wall portions 21a, 21b and a bottom portion 23. The pair of wall portions 21a and 21b are bent from the flat sheet portion 11 via the ridgeline portion 30 and project toward the inside of the closed cross section of the frame member 10. Further, the bottom portion 23 extends so as to connect tip portions of the pair of wall portions 21a and 21b in the extending direction toward the inside of the closed cross section. The recessed portion 20 has a predetermined shape including a predetermined width $L_0$, a length $L_1$ of an inner peripheral wall in the X-Z plane cross-sectional view, and a predetermined depth $\alpha$.

Here, as described above, the recessed portion 20 contributes to the improvement of the shock absorption property in the frame member 10, but the present inventors have found that the shape of the recessed portion 20 has a great influence on the improvement of the shock absorption property. In particular, the present inventors have found that the improvement of the shock absorption property is affected since parameters related to the shape of the recessed portion 20 such as the width $L_0$, the length $L_1$ of the inner peripheral wall, and the depth $\alpha$ when the recessed portion 20 is viewed in the X-Z plane cross section have a predetermined relationship.

Here, the width $L_0$ of the recessed portion 20 and the length $L_1$ of the inner peripheral wall in the X-Z plane cross-sectional view and the depth $\alpha$ can be represented by lengths of each part of the recessed portion 20, which are geometrically obtained from each surface position of the recessed portion 20 and the flat sheet portion 11 at the outside the closed cross section, as described below.

Specifically, an intersection of a virtual straight line $L_2$ in which a surface position of the flat sheet portion 11 extends in the Z direction and the virtual straight line $L_3$ in which a surface position of the wall portion 21a extends in the extending direction of the wall portion 21a is defined as point A.

Further, an intersection of the virtual straight line $L_4$ in which a surface position of the bottom portion 23 extends in the Z direction and the virtual straight line $L_3$ in which the surface position of the wall portion 21a extends in the extending direction of the wall portion 21a is defined as a point B.

An intersection of the virtual straight line $L_4$ in which the surface position of the bottom portion 23 extends in the Z direction and the virtual straight line $L_5$ in which a surface position of the wall portion 21b extends in the extending direction of the wall portion 21b is defined as a point C.

An intersection of the virtual straight line $L_2$ in which the surface position of the flat sheet portion 11 extends in the Z direction and the virtual straight line $L_5$ in which the surface position of the wall portion 21b extends in the extending direction of the wall portion 21b is defined as a point D.

Here, the distance between the point A and the point D is $L_0$, and the length of a bending line connecting the point A to the point D via the point B and the point C is defined as $L_1$. Further, a length of a straight line $L_6$ which connects in the X direction the virtual straight line $L_2$ in which the surface of the flat sheet portion 11 extends in the Z direction and the virtual straight line $L_4$ in which the surface position of the bottom portion 23 extends in the Z direction at a position in the middle of the width $L_0$ is defined as the depth $\alpha$.

The above mentioned intersections are determined by calculating a virtual straight line extending each surface position outside the closed cross section of the recessed portion 20 and the flat sheet portion 11 based on a known image analysis method from the cross-sectional image of the frame member 10, and calculating the intersections thereof.

In the frame member 10 according to the present embodiment, the recessed portion 20 has a shape in which a depth is 5 mm or more and a value of $(L_1-L_0)/L_0$ is 0.18 or more and 2.8 or less. Hereinafter, the shape of the recessed portion 20 will be described in detail.

The present inventors adjusted the value of $(L_1-L_0)/L_0$, which is a value indicating the relationship of parameters related to the shape of the recessed portion 20 by changing the length $L_1$ (mm) of the bending line, the width $L_0$ (mm), and the depth α (mm) in the recessed portion 20, and evaluated the shock absorption property of the frame member 10. The results are shown in Table 1. The shock absorption property was evaluated by a three-point bending test using a hat-shaped member having a top sheet portion width of 80 mm, a side wall portion height of 80 mm, and a length in a material axis direction of 800 mm. In the process of pushing an impactor with an R of 50 mm, the reaction force to the impactor was measured by a load cell, and the value of [reaction force]×[stroke of impactor] was determined as an absorption energy. Then, based on the value of the absorption energy of the test piece obtained by the test piece in which the depth of the recessed portion is 0.5 mm, the absorption energies of materials obtained from test pieces having recessed portions of various depths were relatively evaluated. The shock absorption property was evaluated in three stages, such as, it was evaluated as A in a case where the absorption energy is 1.5 times or more of the reference value, it was evaluated as B in a case where the absorption energy is 1.2 times or more of the reference value, and it was evaluated as C in a case where the absorption energy is below the reference value. A and B were used as an acceptance criterion.

TABLE 1

| | Length of bending line $L_1$ (mm) | Groove width $L_0$ (mm) | Groove depth α (mm) | $(L_1 - L_0)/L_0$ | Shock absorption property |
|---|---|---|---|---|---|
| No. 1 | 16.07 | 15.0 | 0.5 | 0.07 | C |
| No. 2 | 16.13 | | 1.0 | 0.13 | C |
| No. 3 | 16.67 | | 5.0 | 0.67 | A |
| No. 4 | 17.33 | | 10.0 | 1.33 | A |
| No. 5 | 18.67 | | 20.0 | 2.67 | B |
| No. 6 | 20.00 | | 30.0 | 4.00 | C |
| No. 7 | 20.67 | | 35.0 | 4.67 | C |
| No. 8 | 21.05 | 20.0 | 0.5 | 0.05 | C |
| No. 9 | 21.1 | | 1.0 | 0.10 | C |
| No. 10 | 21.5 | | 5.0 | 0.50 | A |
| No. 11 | 22 | | 10.0 | 1.00 | A |
| No. 12 | 23 | | 20.0 | 2.00 | B |
| No. 13 | 24 | | 30.0 | 3.00 | C |
| No. 14 | 24.5 | | 35.0 | 3.50 | C |
| No. 15 | 26.04 | 25.0 | 0.5 | 0.04 | C |
| No. 16 | 26.08 | | 1.0 | 0.08 | C |
| No. 17 | 26.4 | | 5.0 | 0.40 | A |
| No. 18 | 26.8 | | 10.0 | 0.80 | A |
| No. 19 | 27.6 | | 20.0 | 1.60 | A |
| No. 20 | 28.4 | | 30.0 | 2.40 | B |
| No. 21 | 28.8 | | 35.0 | 2.80 | B |

A Vickers hardness of the flat sheet portion 11 of the frame member 10 was 350 Hv, and a thickness of the flat sheet portion 11 was 1.2 mm. As a result, it was found that the frame member having the recessed portion 20 having a depth of 5 mm or more and a value of $(L_1-L_0)/L_0$ of 0.18 or more and 2.8 or less exhibits excellent shock absorption property.

The reason an excellent shock absorption property cannot be exhibited when the value of $(L_1-L_0)/L_0$ is larger than 2.8 is that when the recessed portion 20 is formed in the frame member 10, the thickness of the recessed portion 20 becomes thin and the absorption energy when deformed by an impact becomes reduced.

As the thickness of the recessed portion 20 becomes thinner, the maximum bending moment of the frame member 10 in the X-Z plane decreases. This has a great influence when the frame member 10 thinned by using a high-strength material having a Vickers hardness of 330 Hv or more at the center of the thickness is applied as the vehicle body frame member.

Therefore, when the value of $(L_1-L_0)/L_0$ is larger than 2.8, the absorption energy is reduced and the maximum bending moment is also reduced, so that the shock absorption property of the frame member 10 is not sufficiently exhibited. In other words, when the value of $(L_1-L_0)/L_0$ is 2.8 or less, the sheet thickness in the recessed portion 20 is secured, and the shock absorption property of the frame member 10 is sufficiently exhibited.

On the other hand, it was found that when the value of $(L_1-L_0)$ is smaller than 0.18, the improvement of the maximum bending moment in the X-Z plane by the recessed portion 20 becomes small, and a proof stress of the frame member 10 does not improve. Therefore, when the value of $(L_1-L_0)/L_0$ is 0.18 or more, the proof stress of the frame member 10 can be further improved by the recessed portion 20, and an excellent shock absorption property can be exhibited.

As described above, from the results shown in Table 1, the shock absorption property of the frame member 10 is sufficiently exhibited when the value of $(L_1-L_0)/L_0$, which is a parameter related to the shape of the recessed portion 20, satisfies the relational expression of $0.18 \leq (L_1-L_0)/L_0 \leq 2.8$.

Further, in particular, the value of $(L_1-L_0)/L_0$, which is a parameter related to the shape of the recessed portion 20, may be set to 1.8 or less. As a result, the thickness of the recessed portion 20 after molding is further secured, the absorption energy at the time of deformation of the frame member 10 is increased, and the impact property can be further improved.

Figure 4:
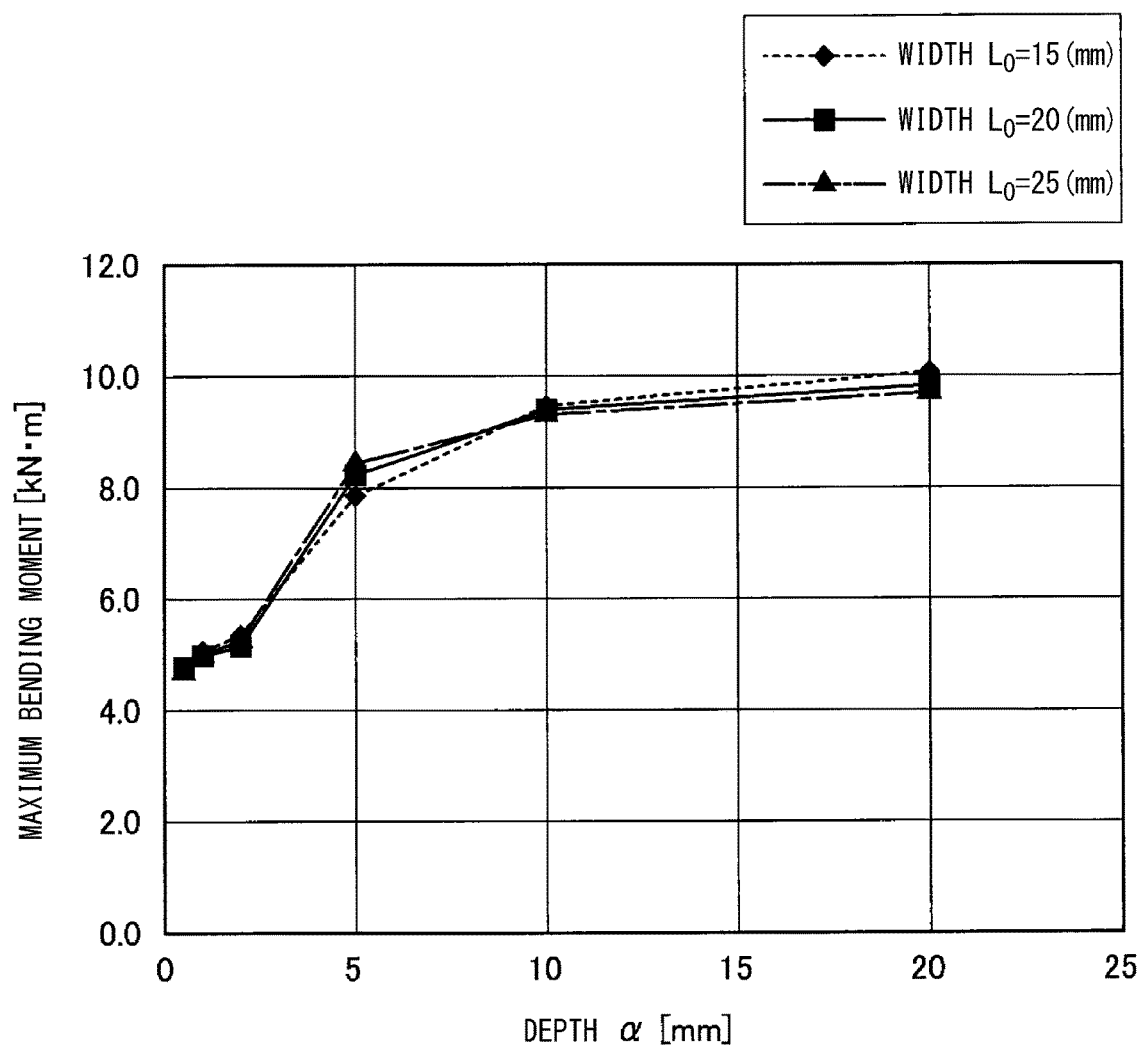
FIG. 4 is a graph showing the relationship between a depth of the recessed portion of the frame member according to the first embodiment and a maximum bending moment.

Subsequently, with reference to FIG. 4, the relationship between the shape of the recessed portion 20 and the shock absorption property will be described with respect to the relationship between the value of the depth α of the recessed portion 20 and the value of the maximum bending moment in the X-Z plane of the frame member 10. FIG. 4 is a graph showing the relationship between the depth α of the recessed portion 20 and the maximum bending moment.

As shown in FIG. 4, for example, when the width $L_0$ is 15 mm, as the value of the depth α is increased, the maximum bending moment of the frame member 10 also increases. In particular, the maximum bending moment when the depth α is 5 mm or more is greatly increased as compared with the value of the maximum bending moment when the depth α is 5 mm or less. Therefore, when the value of the depth α is 5 mm or more, the effect of increasing the maximum bending moment in the frame member 10 can be greatly obtained.

After that, as the value of the depth α increases, the maximum bending moment also increases, but when the value of the depth α reaches 20 mm, it can be seen that the effect of increasing the maximum bending moment is hardly obtained. Therefore, the value of the depth α may be 20 mm or less, and in that case, it is not necessary to increase the depth α unnecessarily.

Further, as shown in FIG. 4, when the width $L_0$ is 20 mm and 25 mm, the same tendency as the result when the width $L_0$ is 15 mm is observed.

The width $L_0$ is preferably 80 mm or less in order to reduce stress concentration on the bottom portion.

Further, it is preferable that the ratio of the width $L_0$ to the width along the surface position of the bottom portion 23 be 0.70 or more and 1.20 or less in order to reduce the stress concentration.

[Relationship Between Ridgeline Portion Hardness and Flat Sheet Portion Hardness]

Figure 5:
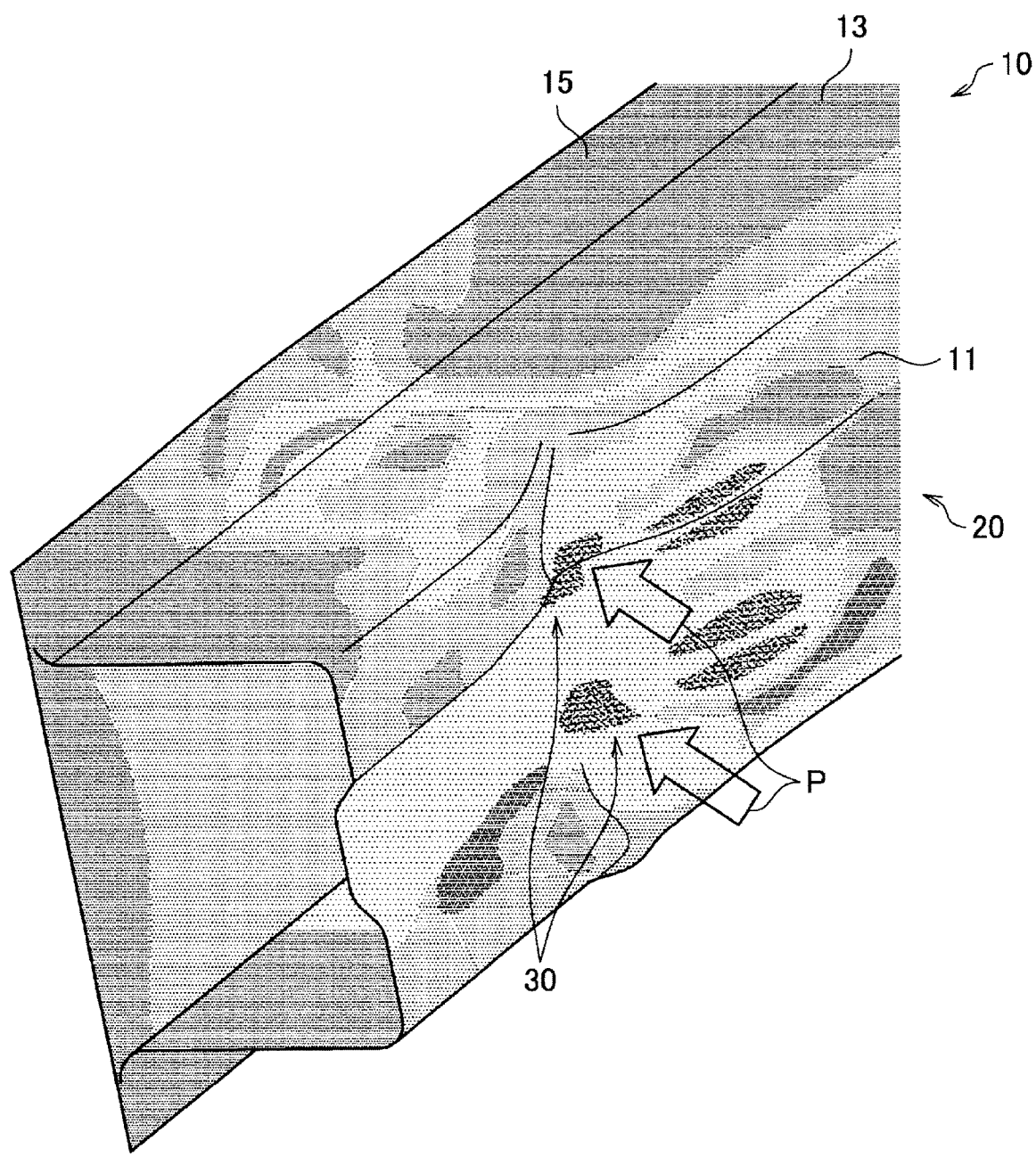
FIG. 5 shows the state of deformation of the frame member when an impact load is input to the frame member according to the first embodiment.
Figure 6:
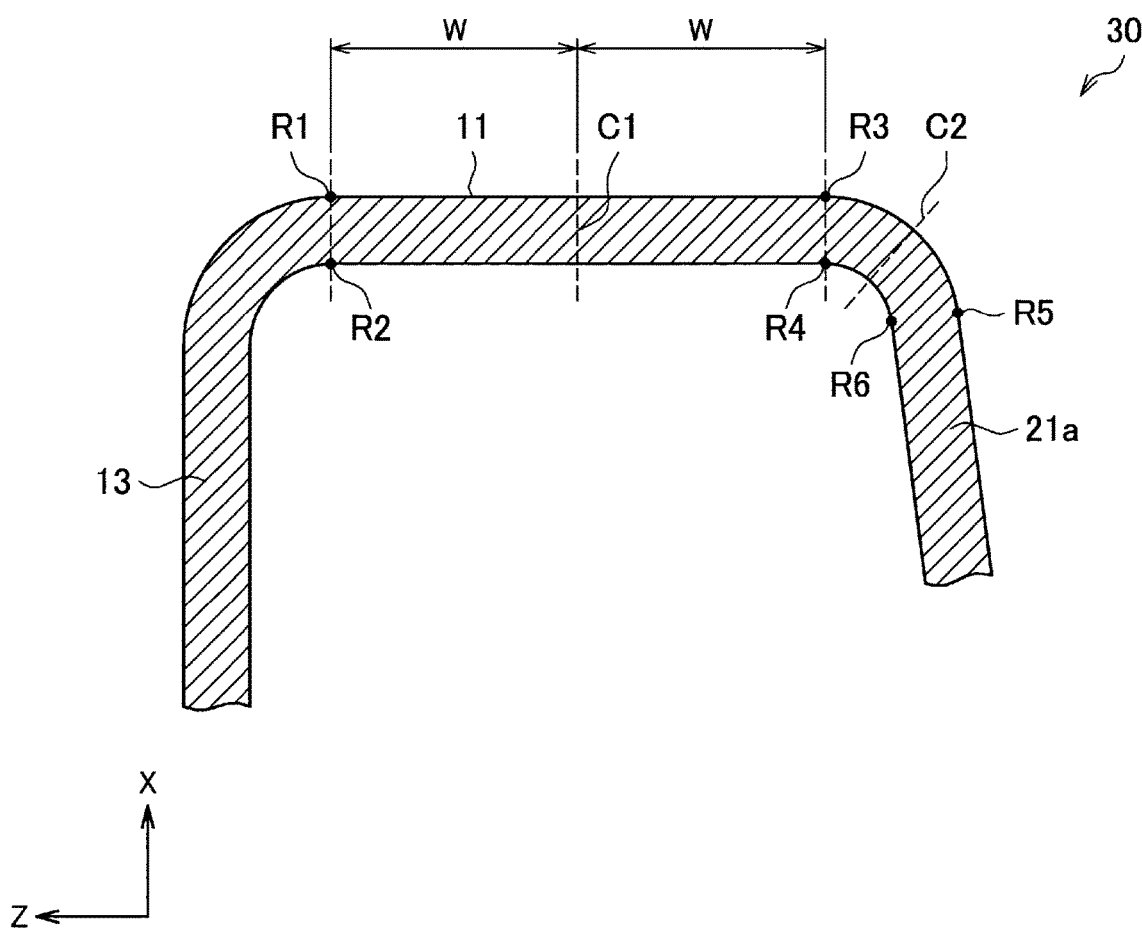
FIG. 6 is an enlarged cross-sectional view of a region including a flat sheet portion and a ridgeline portion of the frame member along the X-Z plane.

Subsequently, the hardness of the ridgeline portion 30 will be described with reference to FIGS. 5 to 7. FIG. 5 is a diagram showing a state of deformation of the frame member 10 according to the present embodiment when an impact load is input to the frame member 10.

As shown in FIG. 5, it is assumed that the impact load P is input to the flat sheet portion 11 of the frame member 10 from the direction perpendicular to the plane of the flat sheet portion 11 (see the arrow in FIG. 5). In this case, the recessed portion 20 and the flat sheet portion 11 are deformed by the impact load P. An analysis was performed to investigate stress distribution in the frame member 10 at the time of this deformation. Based on the analysis results, FIG. 5 shows that the higher the stress region, the higher the density of point hatching. As shown in FIG. 5, it was found that when the impact load P was input to the flat sheet portion 11, high stress was generated in the ridgeline portion 30. That is, it was found that the ridgeline portion 30 largely shares the load when the impact load is input to the flat sheet portion 11 of the frame member 10.

Therefore, the present inventors studied to improve the shock absorption property of the frame member 10 by controlling the hardness of the ridgeline portion 30. The relationship between the hardness of the ridgeline portion 30 and the maximum bending moment of the X-Z plane of the frame member 10 will be described with reference to FIGS. 6 and 7.

First, the definitions of a Vickers hardness of the ridgeline portion 30 and a Vickers hardness of the flat sheet portion 11 will be described with reference to FIG. 6. FIG. 6 is an enlarged X-Z plane sectional view of a region including the flat sheet portion 11 and the ridgeline portion 30 of the frame member 10 according to the present embodiment. As shown in FIG. 6, the ridgeline portion 30 is provided between the flat sheet portion 11 and the recessed portion 20, and connects the flat sheet portion 11 and the wall portions 21a and 21b of the recessed portion 20. The ridgeline portion 30 is a region surrounded by R stop points R3, R4, R5, and R6 shown in FIG. 6. The Vickers hardness of the ridgeline portion 30 is a Vickers hardness at the intermediate position C2 between the R stop points R3 and R4 on the flat sheet portion 11 side and the R stop points R5 and R6 on the recessed portion 20 side in the ridgeline portion 30.

Further, the flat sheet portion 11 is a region extending between the recessed portion 20 and the side wall portion 13. As shown in FIG. 6, the Vickers hardness of the flat sheet portion 11 is a Vickers hardness at the intermediate position C1 (a position at the same distance W from the points R1 and R2 and the points R3 and R4) between the R stop points R1 and R2 on the flat sheet portion 11 side of the bent portion connecting the flat sheet portion 11 and the side wall portion 13, and the R stop points R3 and R4 of the ridgeline portion 30.

Conditions for measuring the hardness are as follows. A cross section of a sample in the form of a plate that is a cross section perpendicular to the plate surface of the sample including the recessed portion 20 of the frame member 10 is obtained, and a measurement surface is prepared as a sample under measurement, followed by a Vickers hardness test. A method for preparing the measurement surface is carried out in compliance with JIS Z 2244:2009. After any of a #600 silicon carbide sheet to a #1500 silicon carbide sheet is used to polish the measurement surface, a liquid made of a diluting liquid, such as alcohol, or pure water in which diamond powder having a grain size ranging from 1 to 6 μm is dispersed is used to finish the polished measurement surface into a mirror surface. The Vickers hardness test is carried out based on the method specified in JIS Z 2244: 2009. The Vickers hardness is measured on the sample on which the measurement surface is prepared, using a Micro Vickers hardness tester with a test load of 1 kgf (9.8 N).

Further, the Vickers hardness of the flat sheet portion 11 and the Vickers hardness of the ridgeline portion 30 are respectively a Vickers hardness of a position at a depth corresponding to ⅛ of the thickness in the thickness direction from the surfaces of the flat sheet portion 11 and the ridgeline portion 30. The Vickers hardness of the ridgeline portion 30 is a Vickers hardness of a bent outside.

The Vickers hardness of the flat sheet portion 11 is at least 330 Hv or more. The Vickers hardness of the flat sheet portion 11 mentioned herein means a Vickers hardness of a region of the flat sheet portion 11 excluding the recessed portion 20. Further, the Vickers hardness of the flat sheet portion 11 may be 410 Hv or more. The upper limit of the Vickers hardness of the flat sheet portion 11 is 550 Hv.

Subsequently, with reference to FIG. 7, it will be described that the maximum bending moment is improved when the Vickers hardness of the ridgeline portion 30 is improved with respect to the Vickers hardness of the flat sheet portion 11. FIG. 7 is a graph showing the relationship between the Vickers hardness of the ridgeline portion 30 with respect to the Vickers hardness of the flat sheet portion 11 and the value of the maximum bending moment of the Vickers hardness of the ridgeline portion 30.

Figure 7:
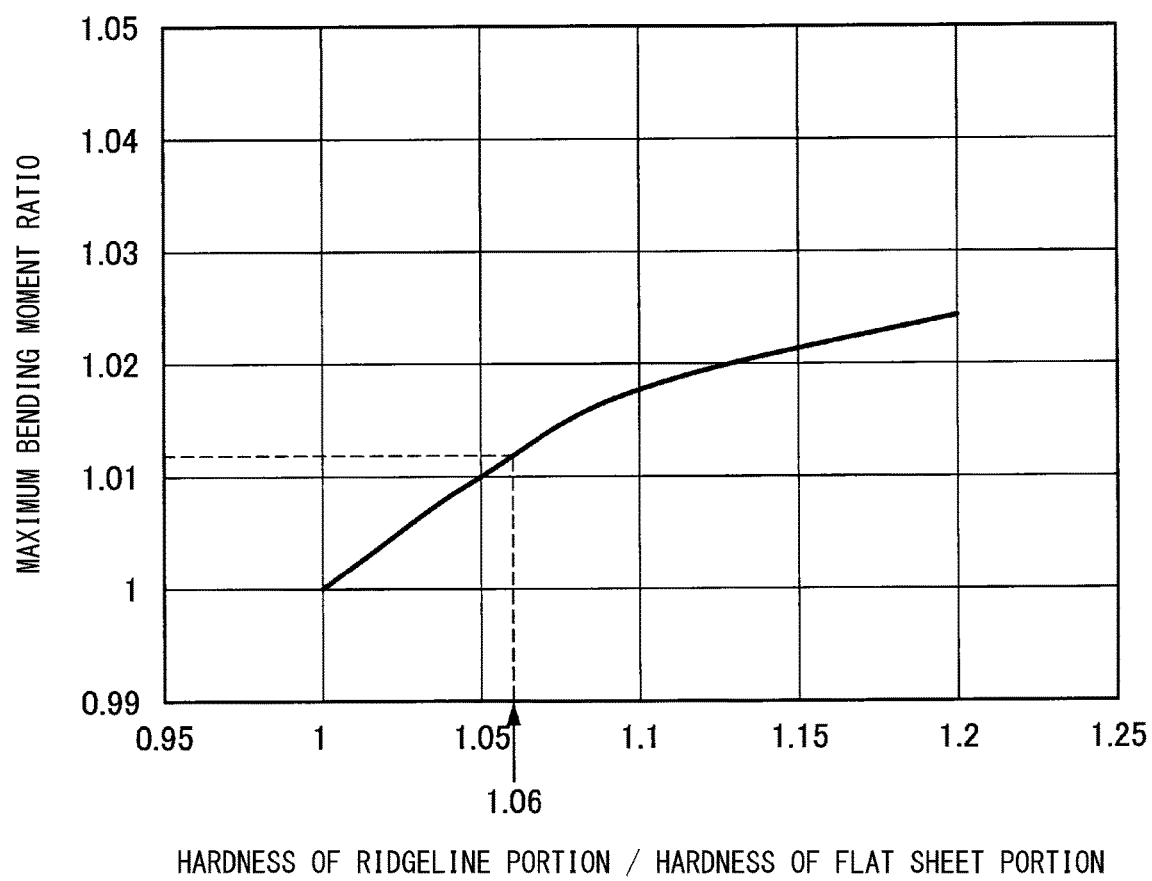
FIG. 7 is a graph which shows the relationship between a Vickers hardness of a ridgeline portion and a Vickers hardness of the flat sheet portion, and the maximum bending moment.

First, as shown in FIG. 7, when the Vickers hardnesses of the ridgeline portion 30 and the flat sheet portion 11 are the same (Vickers hardness of the ridgeline portion 30/Vickers hardness of the flat sheet portion 11=1), the obtained maximum bending moment is set to 1. In FIG. 7, since the Vickers hardness of the ridgeline portion 30 is 1 with respect to the Vickers hardness of the flat sheet portion 11, as the Vickers hardness of the ridgeline portion 30 increases, the value of the maximum bending moment also gradually increases. That is, by improving the Vickers hardness of the ridgeline portion 30, the maximum bending moment of the frame member 10 is also improved.

Here, the maximum bending moment of the thin-walled structural member increases as a material strength (a Vickers hardness) used for the structural member increases. On the other hand, a range (an effective width) (that is, an area receiving stress during collision deformation) that receives the stress at the time of collision reduces. Therefore, when the material strength exceeds a predetermined value, the increase in the maximum bending moment tends to stabilize. In the frame member 10 according to the present embodiment, as shown in FIG. 7, when the Vickers hardness of the ridgeline portion 30 is 1.06 times or more the Vickers hardness of the flat sheet portion 11, the increase in the maximum bending moment ratio is stabilized. This makes it easier to secure an amount of shock absorption. On the other hand, in the range where the Vickers hardness of the ridgeline portion 30 is smaller than 1.06 times the Vickers hardness of the flat sheet portion 11, the maximum bending moment ratio increases substantially linearly. Therefore, it is desirable that the frame member 10 be used under the condition that the Vickers hardness of the ridge portion 30 is 1.06 times or more the Vickers hardness of the flat sheet portion 11 and the maximum bending moment ratio is sufficiently increased. As a result, the value of the maximum bending moment can be improved, and the shock absorption property of the frame member 10 can be improved. The Vickers hardness of the flat sheet portion 11 mentioned herein means the Vickers hardness of the region of the flat sheet portion 11 excluding the recessed portion 20.

Further, when the ratio of the Vickers hardness of the ridgeline portion 30 to the Vickers hardness of the flat sheet portion 11 is 1.20 times or less, it is possible to secure a high level maximum bending moment while suppressing breakage from the boundary portion due to the hardness difference between the ridgeline portion 30 and the flat sheet portion 11. Therefore, the upper limit of the ratio of the Vickers hardness of the ridgeline portion 30 to the Vickers hardness of the flat sheet portion 11 is 1.20 times.

The ridgeline portion 30 is generally harder than the flat sheet portion due to work hardening. However, it is difficult to make the Vickers hardness of the ridge portion 30 to be 1.06 times or more the Vickers hardness of the flat sheet portion 11 only by increasing the hardness due to work hardening, even if a steel sheet having a hardness exceeding 330 Hv is formed into the shape of the present embodiment.

Further, when the hardness is adjusted by partial quenching, the hardness of the ridgeline portion is vastly improved, and it becomes difficult to reduce the hardness to 1.20 times or less. In this case, the hardness difference between the ridgeline portion 30 and the flat sheet portion 11 becomes excessively large, breakage occurs from the boundary portions thereof, and the shock absorption energy may not be increased. Therefore, in order to control the ratio of the Vickers hardness of the ridgeline portion 30 to the Vickers hardness of the flat sheet portion 11 from 1.06 to 1.20, it is preferable to adjust the hardness of the ridgeline portion by hardening with a strain-induced transformation.

Effects

According to the present embodiment, in a member having a sufficient Vickers hardness of 330 Hv or more in the flat sheet portion 11, since the depth $\alpha$ of the recessed portion 20 is 5 mm or more, the shape of the recessed portion 20 is limited to a predetermined range by a parameter of $(L_1-L_0)/L_0$, and the cross-sectional shape of the frame member 10 is made into an appropriate shape, the shock absorption property can be further improved. That is, since the recessed portion 20 has a sufficient depth $\alpha$, the maximum bending moment can be improved and the cross-sectional yield strength can be improved. Further, since the parameter $(L_1-L_0)/L_0$ relating to the shape of the recessed portion 20 is set in a predetermined range, the thickness of the recessed portion 20 can be secured and the shock absorption energy of the frame member 10 can be increased. When the flat sheet portion 11 has a Vickers hardness of 330 Hv or more, out-of-plane deformation is likely to occur in the side wall portion 13 or the like of the frame member 10, elastic buckling occurs, and it often does not contribute to the shock absorption property. Therefore, by providing the recessed portion 20 in which the parameter $(L_1-L_0)/L_0$ is set in a predetermined range, elastic buckling is effectively suppressed, the cross-sectional yield strength of the frame member 10 is improved, and the shock absorption energy is further increased. Therefore, the shock absorption property of the frame member 10 can be realized at a higher level.

Further, according to the present embodiment, since the Vickers hardness of the ridgeline portion 30 between the recessed portion 20 and the flat sheet portion 11 is set to a predetermined value or more with respect to the Vickers hardness of the flat sheet portion 11, the shock absorption property of the frame member 10 can be further improved. That is, when a load is input to the flat sheet portion 11 of the frame member 10, high stress is generated in the ridgeline portion 30 and the load is shared. Therefore, the deformation of the recessed portion 20 can be suppressed by having an even higher Vickers hardness than the Vickers hardness of the flat sheet portion 11 in the ridgeline portion 30. As a result, the maximum bending moment of the frame member 10 can be further improved, and the shock absorption property can be further improved.

[Application Example of Frame Member According to Embodiment of Present Invention]

Figure 8:
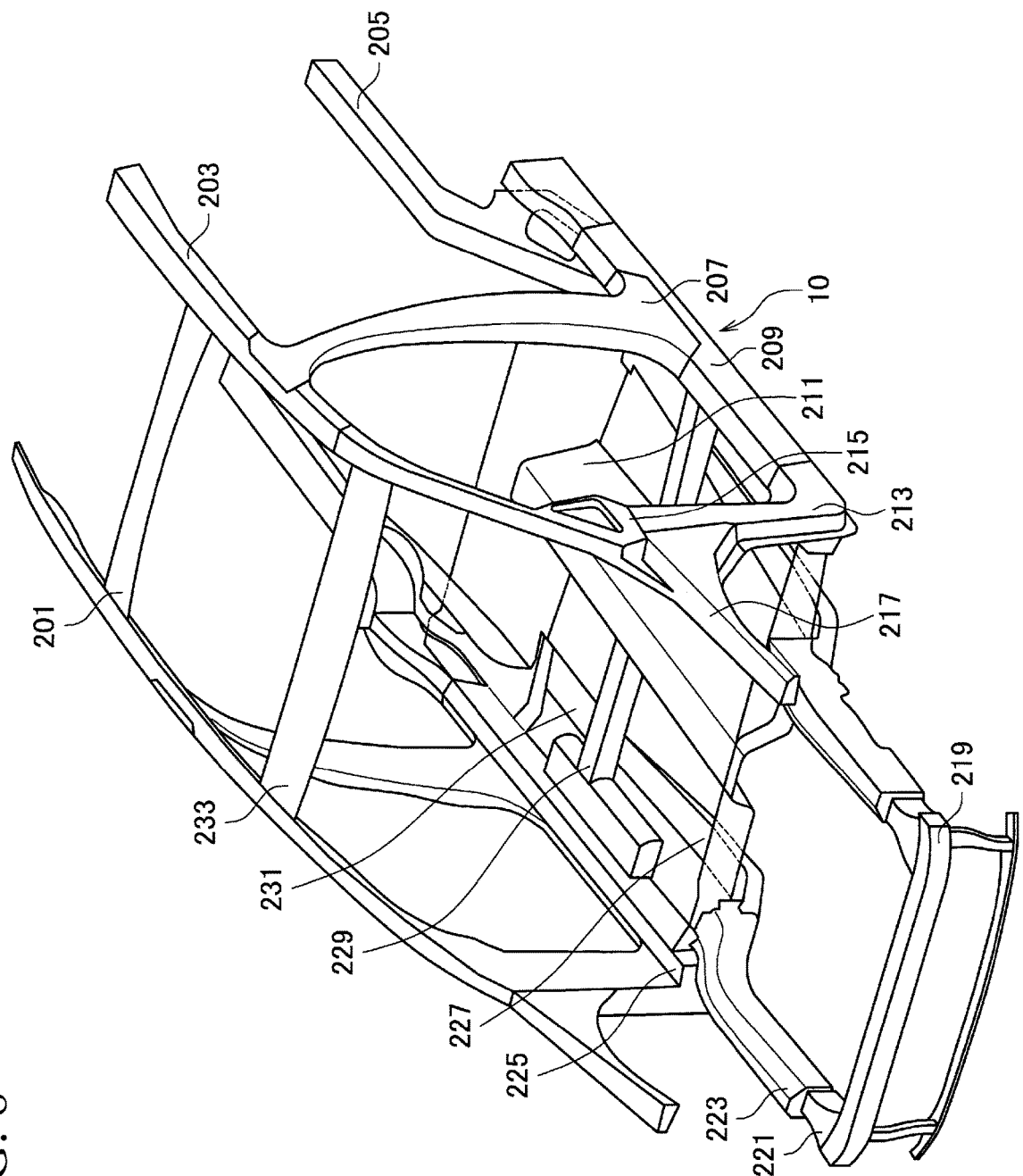
FIG. 8 shows an automobile frame as an example to which a frame member is applied.

The preferred embodiments of the present invention have been described in detail above. From here, an application example of the frame member according to the embodiment of the present invention will be described with reference to FIG. 8. FIG. 8 is a diagram showing an automobile frame 1 as an example to which the frame member 10 according to the embodiment of the present invention is applied. The frame member 10 may constitute the automobile frame 1 as a cabin frame or a shock absorption frame. Examples of application of the frame member 10 as a cabin frame may include a roof center reinforcement 201, a roof side rail 203, a B pillar 207, a side sill 209, a tunnel 211, an A pillar lower 213, an A pillar upper 215, a kick reinforcement 227, a floor cross member 229, an under reinforcement 231, a front header 233 and the like.

Further, examples of application of the frame member 10 as a shock absorption frame may include a rear side member 205, an apron upper member 217, a bumper reinforcement 219, a crash box 221 and a front side member 223.

Since the frame member 10 is used as a cabin frame or a shock absorption frame, the frame member 10 has a sufficient load capacity, so that deformation at the time of collision can be reduced. Further, the frame member 10 has improved deformability, and even when an input such as a side collision is input to the automobile frame 1, the impact can be absorbed by sufficient deformation and the inside of the frame can be protected.

Preferable embodiments of the present invention have been described above with reference to the accompanying drawings, but the present invention is not limited thereto. It is apparent that a person who has typical knowledge in the technical field to which the present invention belongs can realize a variety of changes or modifications within the technical idea set forth in the claims, and it is understood that the changes or modifications also naturally belong to the technical scope of the present invention.

For example, in the above embodiment, the flat sheet portion 11 is provided with the recessed portion 20; however, the present invention is not limited to this example. For example, the recessed portion 20 may be provided not only in the flat sheet portion 11 but also in the side wall portion 13.

Further, in the above embodiment, although the flange portion 15 is welded to the plate-shaped member 40, the present invention is not limited to this example. For example, it may be welded directly to the end portion of the side wall portion 13 without passing through the flange portion 15. Further, for example, instead of the plate member 40, a mating member may be a member having a cross-section hat shape having a flange portion, and the flange portion 15 of the frame member 10 may be welded to the flange portion of the mating member.

INDUSTRIAL APPLICABILITY

According to the present invention, it is possible to provide a novel and improved frame member capable of further improving a shock absorption property.

BRIEF DESCRIPTION OF THE REFERENCE SYMBOLS

10: Frame member
11: Flat sheet portion
13: Side wall portion
15: Flange section
20: Recessed portion
21a, 21b: Wall portion
23: Bottom section
30: Ridgeline portion
40: Sheet member

The invention claimed is:

1. A frame member having a flat sheet portion with a recessed portion having a pair of wall portions and a bottom portion extending between tip portions in an extending direction of the pair of wall portions,
   a Vickers hardness of a region of the flat sheet portion excluding the recessed portion is 330 Hv or more,
   a depth of the recessed portion is 5 mm or more,
   when a width of the recessed portion is $L_0$ and a cross-sectional length of an inner peripheral wall of the recessed portion consisting of the pair of wall portions and the bottom portion is $L_1$, a value of $(L_1-L_0)/L_0$ is 0.18 or more and 2.8 or less, and
   a Vickers hardness of a ridgeline portion extending between the flat sheet portion and the recessed portion is 1.06 times or more and 1.20 times or less the Vickers hardness of the region of the flat sheet portion excluding the recessed portion.

2. The frame member according to claim 1, wherein the width of the recessed portion is 80 mm or less.

3. The frame member according to claim 1, wherein the depth of the recessed portion is 20 mm or less.

4. The frame member according to claim 1, wherein the value of $(L_1-L_0)/L_0$ is 0.18 or more and 1.8 or less.

5. The frame member according to claim 1, wherein a ratio of the width of the recessed portion to a width along a surface position of the bottom portion is 0.70 or more and 1.20 or less.

6. A frame member having a flat sheet portion with a recessed portion having a pair of wall portions and a bottom portion extending between tip portions in an extending direction of the pair of wall portions,
   a Vickers hardness of a region of the flat sheet portion excluding the recessed portion is 330 Hv or more,
   a depth of the recessed portion is 5 mm or more,
   when a width of the recessed portion is $L_0$ and a cross-sectional length of an inner peripheral wall of the recessed portion comprising the pair of wall portions and the bottom portion is $L_1$, a value of $(L_1-L_0)/L_0$ is 0.18 or more and 2.8 or less, and
   a Vickers hardness of a ridgeline portion extending between the flat sheet portion and the recessed portion is 1.06 times or more and 1.20 times or less the Vickers hardness of the region of the flat sheet portion excluding the recessed portion.

* * * * *